United States Patent
Luo et al.

(10) Patent No.: US 10,013,036 B2
(45) Date of Patent: Jul. 3, 2018

(54) INTELLIGENT POWER DISTRIBUTION SYSTEM AND METHOD

(71) Applicant: Huawei Technologies Co., Ltd., Shenzhen, Guangdong (CN)

(72) Inventors: Zhen Luo, Shenzhen (CN); Weifeng Duan, Shenzhen (CN); Qingyin Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 841 days.

(21) Appl. No.: 13/892,928

(22) Filed: May 13, 2013

(65) Prior Publication Data

US 2013/0253720 A1 Sep. 26, 2013

Related U.S. Application Data

(63) Continuation of application No. PCT/CN2011/074427, filed on May 20, 2011.

(51) Int. Cl.
*G06F 1/26* (2006.01)
*H02J 3/14* (2006.01)
(Continued)

(52) U.S. Cl.
CPC ............ *G06F 1/26* (2013.01); *H02J 3/14* (2013.01); *H02J 13/0006* (2013.01); *H02J 3/16* (2013.01);
(Continued)

(58) Field of Classification Search
CPC ......... G06F 1/26; H02J 13/00; H02J 13/0006; H02J 3/14; H02J 3/16; Y02B 70/3266;
(Continued)

(56) References Cited

U.S. PATENT DOCUMENTS

| 5,710,691 A | 1/1998 | Fowler et al. |
| 2003/0036810 A1 | 2/2003 | Petite |

(Continued)

FOREIGN PATENT DOCUMENTS

| CN | 1305256 A | 7/2001 |
| CN | 101409008 A | 4/2009 |

(Continued)

OTHER PUBLICATIONS $2^{nd}$ Office Action in corresponding Chinese Patent Application No. 201180000841.7 (dated May 6, 2013).
(Continued)

*Primary Examiner* — Miranda Huang
*Assistant Examiner* — John Park
(74) *Attorney, Agent, or Firm* — Leydig, Voit & Mayer, Ltd.

(57) ABSTRACT

The present invention discloses an intelligent power distribution system and method, where the intelligent power distribution system includes: a load identification module, a management module, and an intelligent power distribution box. The management module is electrically connected to the load identification module and the intelligent power distribution box respectively. The load identification module is adapted to identify an electric device electrically connected to the intelligent power distribution system, acquire information of the electric device, and send the acquired information of the electric device to the management module. The management module is adapted to send, according to the information of the electric device sent by the load identification module, a circuit configuration instruction corresponding to the electric device.

12 Claims, 5 Drawing Sheets

(51) Int. Cl.
　　*H02J 13/00*　　(2006.01)
　　*H02J 3/16*　　(2006.01)
(52) U.S. Cl.
　　CPC ....... *Y02B 70/3225* (2013.01); *Y02B 70/3266* (2013.01); *Y02E 40/34* (2013.01); *Y04S 20/222* (2013.01); *Y04S 20/242* (2013.01)
(58) Field of Classification Search
　　CPC ............ Y02B 70/3216; Y02B 70/3225; Y04S 20/242; Y04S 20/221; Y04S 20/222; Y02E 40/34
　　See application file for complete search history.

(56) References Cited

U.S. PATENT DOCUMENTS

| | | |
|---|---|---|
| 2004/0130837 A1 | 7/2004 | Papallo et al. |
| 2005/0033996 A1* | 2/2005 | Fong ................ G06F 1/266 |
| | | 713/300 |
| 2010/0100253 A1* | 4/2010 | Fausak .................. G01D 4/002 |
| | | 700/295 |
| 2010/0161151 A1 | 6/2010 | Yang et al. |
| 2010/0171602 A1* | 7/2010 | Kabbara ................ G06F 1/266 |
| | | 340/333 |

FOREIGN PATENT DOCUMENTS

| | | |
|---|---|---|
| CN | 101527453 A | 9/2009 |
| CN | 102292894 A | 12/2011 |
| WO | WO 03073182 A1 | 9/2003 |
| WO | WO 2004093283 A1 | 10/2004 |
| WO | WO 2010080490 A1 | 7/2010 |

OTHER PUBLICATIONS

International Search Report in corresponding PCT Patent Application No. PCT/CN2011/074427 (dated Feb. 23, 2012).

1st Office Action in corresponding Chinese Patent Application No. 201180000841.7 (dated Sep. 20, 2012).

* cited by examiner

INTELLIGENT POWER DISTRIBUTION SYSTEM AND METHOD

CROSS-REFERENCE TO RELATED APPLICATIONS

This application is a continuation of International Patent Application No. PCT/CN 2011/074427, filed on May 20, 2011, which is hereby incorporated by reference in its entirety.

FIELD OF THE INVENTION

The present invention relates to the technical field of communications, and in particular, to an intelligent power distribution system and method.

BACKGROUND OF THE INVENTION

Along with the advent of the era of third-generation mobile communication technologies (3rd-generation; 3G for short), communication devices become more and more intelligent, which have higher requirements on conventional power distribution, and therefore, a brand new design idea of power distribution emerges, that is, intelligent power distribution implemented through electronic switch technologies, control technologies and monitoring technologies. A power distribution box for the intelligent power distribution is capable of providing excellent value-added services for clients, and output capacity of power distribution branches may be set and managed locally or remotely. In a system using a novel intelligent power distribution box, a power supply is distributed by the intelligent power distribution box and then supplies power for each electric device. A remote management platform performs management, such as monitoring power distribution situation and configuring circuit breaker capacity, on the intelligent power distribution box through a dedicated management network.

In the prior art, the configuration of the circuit breaker capacity of the intelligent power distribution box may be implemented locally or remotely. When the circuit breaker capacity is configured locally, a visual configuration tool (Commissioning Tools), such as a notebook computer or a palmtop (Personal Digital Assistant; PDA for short), may be used to manually configure the switch capacity of the intelligent power distribution box locally according to the actual load situation of the device. The specific configuration procedure includes: first, an engineer manually collects power requirements of electric devices before a system is powered on; configures the circuit breaker capacity of each power supply branch of the intelligent power distribution box by using a configuration tool through a local terminal or by configuring a dual in-line package switch manually; and then, starts the intelligent power distribution box to supply power for the electric devices. When the circuit breaker capacity is configured remotely, a remote management background may be used, so as to configure the switch capacity of the intelligent power distribution box at the remote background according to load situation of the device. The specific configuration procedure includes: first, an engineer manually collects power requirements of electric devices before a system is powered on; configures the circuit breaker capacity of each power supply branch of the intelligent power distribution box by using a configuration tool through the remote background; and then, starts the intelligent power distribution box to supply power for the electric devices.

In the prior art, before configuring the circuit breaker capacity of each branch of the intelligent power distribution box, it is required to collect information of the electric devices manually, and then configure each branch of the intelligent power distribution box separately. Ports of the intelligent power distribution box need to be correspondingly configured for the electric devices, so that the configuration procedure is complex. Errors easily occur in the remote configuration and cannot be found, resulting in that a circuit breaker of the intelligent power distribution box cannot function correspondingly. When load capacity changes, reconfiguration is needed, and automatic configuration according to actual capacity cannot be achieved.

SUMMARY OF THE INVENTION

Embodiments of the present invention provides an intelligent power distribution system and method, so as to solve the defects in the prior art that the configuration of an intelligent power distribution box is complex and errors easily occur, thereby achieving automatic configuration of a matched power supply circuit for an electric device, where the configuration is simple and has high accuracy.

An embodiment of the present invention provides an intelligent power distribution system, including: a load identification module, a management module, and an intelligent power distribution box; where the management module is electrically connected to the load identification module and the intelligent power distribution box respectively;

the load identification module is adapted to identify an electric device electrically connected to the intelligent power distribution system, acquire information of the electric device, and send the acquired information of the electric device to the management module;

the management module is adapted to send, according to the information of the electric device sent by the load identification module, a circuit configuration instruction corresponding to the electric device; and the intelligent power distribution box is adapted to configure, according to the circuit configuration instruction of the management module, a matched power supply circuit for the electric device.

An embodiment of the present invention further provides an intelligent power distribution method, including:

acquiring information of an electric device;

sending, according to the information of the electric device, a circuit configuration instruction corresponding to the electric device; and configuring, by a power distribution switch module, a matched power supply circuit for the electric device according to the circuit configuration instruction.

According to the intelligent power distribution system and method in the embodiments of the present invention, the information of the electric device is acquired from the load identification module through the management module, so as to supply power for the electric device automatically, control an over-current point of the power distribution switch module automatically configured in the intelligent power distribution box, and control the circuit breaker capacity of the intelligent power distribution box; thereby reducing manual involvement during the power distribution, reducing an requirement on installation personnel of the intelligent power distribution box, and improving the installation efficiency and accuracy.

BRIEF DESCRIPTION OF THE DRAWINGS

To illustrate the technical solutions in the embodiments of the present invention or in the prior art more clearly, the accompanying drawings needed for describing the embodiments or the prior art are briefly described in the following. Apparently, the accompanying drawings in the following description merely show some embodiments of the present invention, and persons skilled in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons skilled in the art based on the embodiments of the present invention without creative efforts shall fall within the protection scope of the present invention.

Embodiment 1

Figure 1:
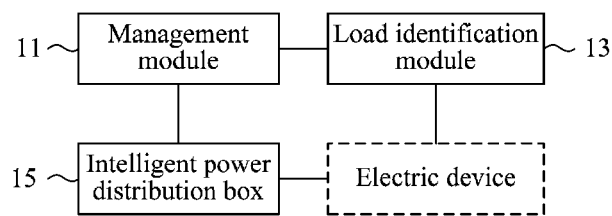
FIG. 1 is a schematic structural diagram of an intelligent power distribution system provided in Embodiment 1 of the present invention.

FIG. 1 is a schematic structural diagram of an intelligent power distribution system provided in Embodiment 1 of the present invention. As shown in FIG. 1, the intelligent power distribution system may include: a load identification module 13, a management module 11 and an intelligent power distribution box 15; where the management module 11 is electrically connected to the load identification module 13 and the intelligent power distribution box 15 respectively;

the load identification module 13 is adapted to identify an electric device electrically connected to the intelligent power distribution system, acquire information of the electric device, and send the acquired information of the electric device to the management module 11;

the management module 11 is adapted to send, according to the information of the electric device sent by the load identification module 13, a circuit configuration instruction corresponding to the electric device; and the intelligent power distribution box 15 is adapted to configure, according to the circuit configuration instruction from the management module 11, a matched power supply circuit for the electric device.

Specifically, according to the embodiment of the present invention, the management module 11 is a management center of the intelligent power distribution system, and may identify information of the electric device connected thereto, through the load identification module 13, where the information includes a device type, a power demand level, functions, a network location of the manufacture, the production date, the serial number, and the like; then, the management module 11 may send the circuit configuration instruction corresponding to the electric device to the intelligent power distribution box 15 according to the information of the electric device sent by the load identification module 13; the intelligent power distribution box 15 further configures, according to the circuit configuration instruction, the matched power supply circuit for the electric device. For example, the management module 11 configures, through the circuit configuration instruction, an over-current point of a power distribution switch module of the intelligent power distribution box 15, and controls an on/off state of the power distribution switch module; the intelligent power distribution box 15 supplies power for the electric device, and performs a remote operation on the power distribution switch module, so as to perform remote operations on an on/off state of a power distribution branch and the over-current point, and provide power distribution and over-current protection functions for the electric device. The load identification module 13 is adapted to identify the information of the electric device, and notify the management module 11 of the power demand level needed by each power distribution branch. In addition, the management module 11 may further implement functions, such as collecting statistics on power consumption of the electric device, and remotely turning off/on the power supply of the electric device.

In this embodiment, the information of the electric device is acquired from the load identification module through the management module, so as to supply power for the electric device automatically, control an over-current point of the power distribution switch module automatically configured in the intelligent power distribution box, and control the circuit breaker capacity of the intelligent power distribution box; thereby reducing manual involvement during the power distribution, reducing a requirement on installation personnel of the intelligent power distribution box, and improving the installation efficiency and accuracy.

Embodiment 2

Figure 2:
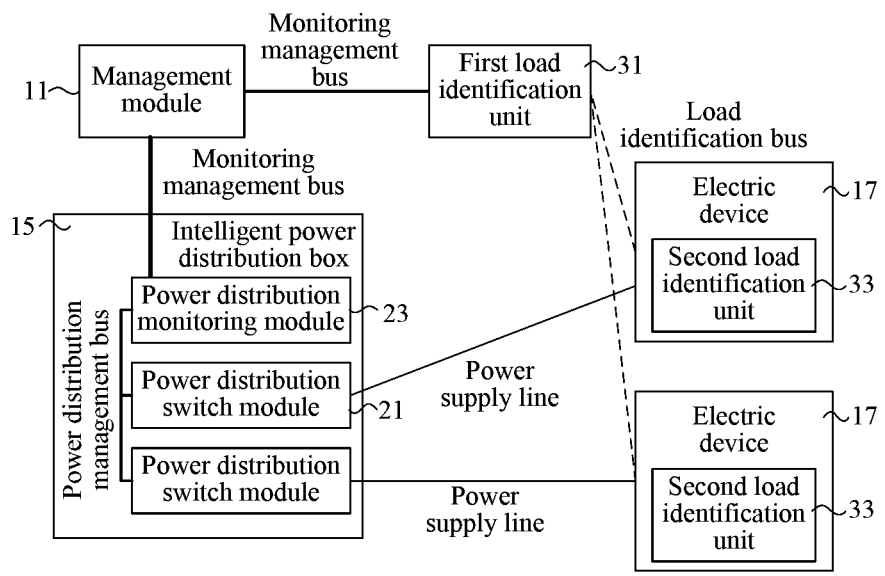
FIG. 2 is a schematic structural diagram of an intelligent power distribution system provided in Embodiment 2 of the present invention.

FIG. 2 is a schematic structural diagram of an intelligent power distribution system provided in Embodiment 2 of the present invention. On the basis of Embodiment 1, as shown in FIG. 2, the management module 11 of the intelligent power distribution system is connected to the load identification module and the intelligent power distribution box 15 respectively through a monitoring management bus; the management module 11 may control, through the monitoring management bus, power on and power off of the intelligent power distribution box 15 and setting of the over-current point of the power distribution switch module 21; the monitoring management bus is an on-site monitoring management bus, which may adopt, for example, an RS485 bus, where the full name of RS-485 is EIA-RS-485C, EIA represents Electronic Industry Association (Electronic Industry Association), RS represents Recommended Standard (Recommended Standard), and 485 represents an identification number. The RS-485 specifies connection cables and mechanical, electrical characteristics, signal functions and a transmission procedure. Moreover, the monitoring management bus may also be a fast Ethernet (Fast Ethernet, FE for short) bus and the like.

The intelligent power distribution box 15 is connected to the electric device 17 through a power supply line.

Further, the load identification module includes: a first load identification unit 31 and a second load identification unit 33, the second load identification unit 33 is connected to the electric device 17, the first load identification unit 31 is connected to the management module 11 through the monitoring management bus, and the first load identification unit 31 is connected to the second load identification unit 33 through a load identification bus. The load identification bus may be in a wireless manner, for example, a radio-frequency identification (Radio-frequency identification, RFID for short) bus, and may also be in a power supply communication manner, for example, a Power line communication (Power line communication or power line carrier, PLC for short) bus, so as to reduce the monitoring management bus in the system. The second load identification unit 33 may be deployed inside the electric device 17, and records a device type, a power demand level, and the like before delivery of the device.

The first load identification unit 31 is adapted to: if receiving a notification of finding that the electric device 17 is powered on sent by the second load identification unit 33, send the notification of finding that the electric device 17 is powered on to the management module 11 through the monitoring management bus; after establishing a connection with the second load identification unit 33 through the load identification bus, acquire information of the electric device 17 from the second load identification unit 33 through the load identification bus; and send the information of the electric device 17 to the management module 11 through the monitoring management bus; and if not receiving the notification of finding that the electric device 17 is powered on sent by the second load identification unit 33, send a notification of not finding that the electric device 17 is powered on to the management module 11.

The second load identification unit 33 is adapted to save information of an electric device 17 to which the second load identification unit 33 belongs; if the electric device 17 to which the second load identification unit 33 belongs is powered on, send, to the first load identification unit 31, the notification of finding that the electric device 17 is powered on; and after establishing the connection with the first load identification unit 31, send the information of the electric device 17 to the first load identification unit 31 through the load identification bus. The second load identification unit 33 may be integrated with the electric device into one piece, and may also be independent of the electric device, provided that the information of the electric device 17 to which the second load identification unit 33 belongs can be saved therein.

Further, the intelligent power distribution box 15 may include: a power distribution monitoring module 23 and at least one power distribution switch module 21. The power distribution monitoring module 23 is connected to the management module 11, and the power distribution switch module 21 is connected to the power distribution monitoring module 23.

The power distribution monitoring module 23 is adapted to: according to an instruction of the management module 11, control ON or OFF of the power distribution switch module 21, and configure an over-current point of the power distribution switch module 21 corresponding to the electric device 17.

The power distribution monitoring module 23 is connected to the management module 11 through the monitoring management bus, and the power distribution switch module 21 is connected to the power distribution monitoring module 23 through a power distribution management bus.

The power distribution management bus may be an inter-integrated circuit (Inter-Integrated Circuit, I2C for short) bus, a switch value bus, and the like.

In addition, the management module 11 is further adapted to: if receiving the notification of not finding that the electric device 17 is powered on sent by the load identification module 13, instruct the intelligent power distribution box 15 to turn off the power distribution switch module 21.

The power distribution switch module may specifically be an electronic power distribution switch. The electronic power distribution switch may be formed by an electronic power distribution switch processor and a high-power metal oxide semiconductor (MOS), the electronic power distribution switch processor may include a microprocessor (MCU), a programmable logic device (CPLD/EPLD), or a digital signal processor (DSP), and the like. Therefore, the electronic power distribution switch may be implemented by controlling the high-power MOS through the MCU, CPLD/EPLD or DSP.

In addition, the intelligent power distribution box further includes a storage unit, adapted to store configuration information of each power distribution switch module.

Therefore, the management module may further be adapted to: acquire actual configuration information of each power distribution switch module; compare the actual configuration information with corresponding configuration information of the power distribution switch module stored in the storage unit, if the actual configuration information is not consistent with the corresponding configuration information, configure the over-current point of the power distribution switch module according to the information of the electric device, and update the corresponding configuration information of the power distribution switch module stored in the storage unit.

In this embodiment, the information of the electric device is acquired from the load identification module through the management module, so as to supply power for the electric device automatically, control an over-current point of the power distribution switch module automatically configured in the intelligent power distribution box, and control the circuit breaker capacity of the intelligent power distribution box; thereby reducing manual involvement during the power distribution, reducing a requirement on installation personnel of the intelligent power distribution box, and improving the installation efficiency and accuracy.

Embodiment 3

Figure 3:
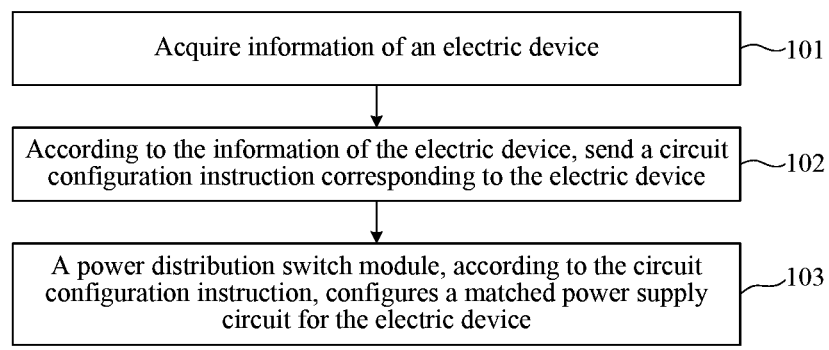
FIG. 3 is a flow chart of an intelligent power distribution method provided in Embodiment 3 of the present invention.

FIG. 3 is a flow chart of an intelligent power distribution method provided in Embodiment 3 of the present invention. As shown in FIG. 3, the intelligent power distribution method includes:

Step 101: Acquire information of an electric device.

The step 101 may specifically include: when the electric device is powered on, receiving, through a monitoring management bus, a notification that the electric device is powered on; and according to the notification that the electric device is powered on, acquiring the information of the electric device through a load identification bus.

In addition, the intelligent power distribution method may further include: if a notification of not finding that the electric device is powered on is received, instructing that a power distribution switch module is turned off.

Step 102: Send, according to the information of the electric device, a circuit configuration instruction corresponding to the electric device.

Step 103: The power distribution switch module configures, according to the circuit configuration instruction, a matched power supply circuit for the electric device.

In addition, the intelligent power distribution method may further include:
- acquiring actual configuration information of each power distribution switch module;
- comparing the actual configuration information with corresponding configuration information of the power distribution switch module stored in a storage unit; and
- if the actual configuration information is not consistent with the corresponding configuration information, according to the information of the electric device, configuring an over-current point of the power distribution switch module, and updating the corresponding configuration information of the power distribution switch module stored in the storage unit.

The intelligent power distribution method according to the embodiment of the present invention may be executed in the intelligent power distribution system of any structure according to the foregoing embodiments. For example, a load identification module identifies an electric device electrically connected to the intelligent power distribution system, acquires information of the electric device, and sends the acquired information of the electric device to a management module; the management module sends, according to the information of the electric device sent by the load identification module, a circuit configuration instruction corresponding to the electric device; and an intelligent power distribution box configures, according to the circuit configuration instruction from the management module, a matched power supply circuit for the electric device.

Referring to Embodiment 2, the load identification module may include: a first load identification unit and a second load identification unit, the second load identification unit is connected to the electric device, the first load identification unit is connected to the management module through the monitoring management bus, and the first load identification unit is connected to the second load identification unit through a load identification bus. In this case, the foregoing step 101 may specifically include:
- if the first load identification unit receives, through the load identification bus, the notification that the electric device is powered on sent by the second load identification unit, sending the notification that the electric device is powered on to the management module through the monitoring management bus;
- after the first load identification unit establishes a connection with the second load identification unit through the load identification bus, acquiring the information of the electric device from the second load identification unit through the load identification bus; and
- sending, by the first load identification unit, the information of the electric device to the management module through the monitoring management bus.

Further, if the management module receives the notification of not finding that the electric device is powered on sent by the load identification module, the management module instructs the intelligent power distribution box to turn off the power distribution switch module.

Further, the management module may acquire actual configuration information of each power distribution switch module; compare the actual configuration information with corresponding configuration information of the power distribution switch module stored in the storage unit; if the actual configuration information is not consistent with the corresponding configuration information, according to the information of the electric device, configure the over-current point of the power distribution switch module, and update the corresponding configuration information of the power distribution switch module stored in the storage unit.

In this embodiment, the information of the electric device is acquired from the load identification module through the management module, so as to supply power for the electric device automatically, control an over-current point of the power distribution switch module automatically configured in the intelligent power distribution box, and control the circuit breaker capacity of the intelligent power distribution box; thereby reducing manual involvement during the power distribution, reducing a requirement on installation personnel of the intelligent power distribution box, and improving the installation efficiency and accuracy.

Embodiment 4

Figure 4A:
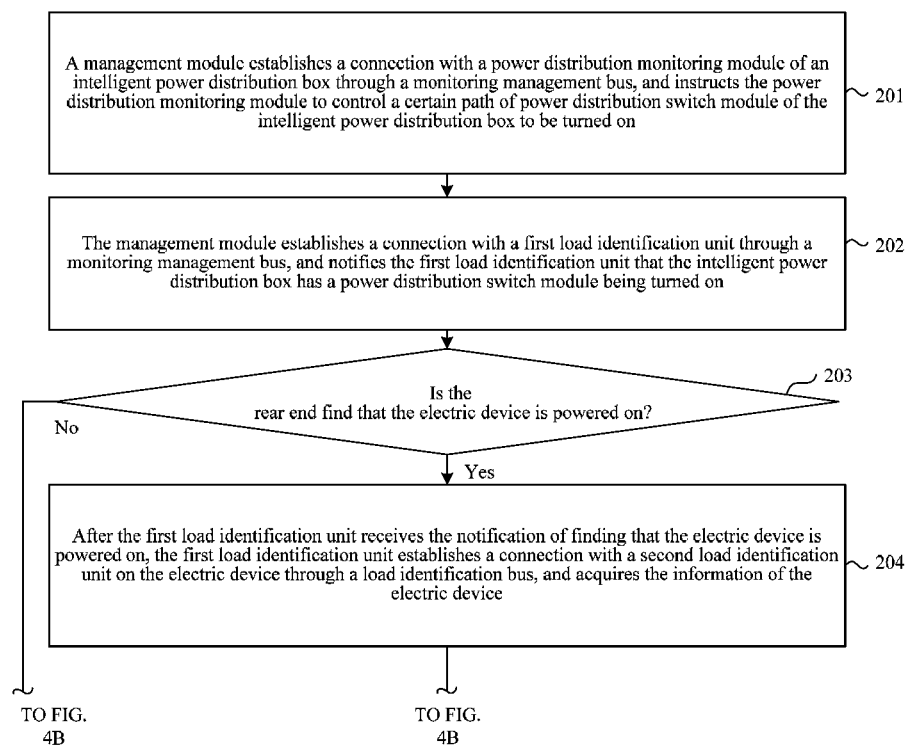
FIG. 4A and FIG. 4B are a flow chart of an intelligent power distribution method provided in Embodiment 4 of the present invention.
Figure 4B:
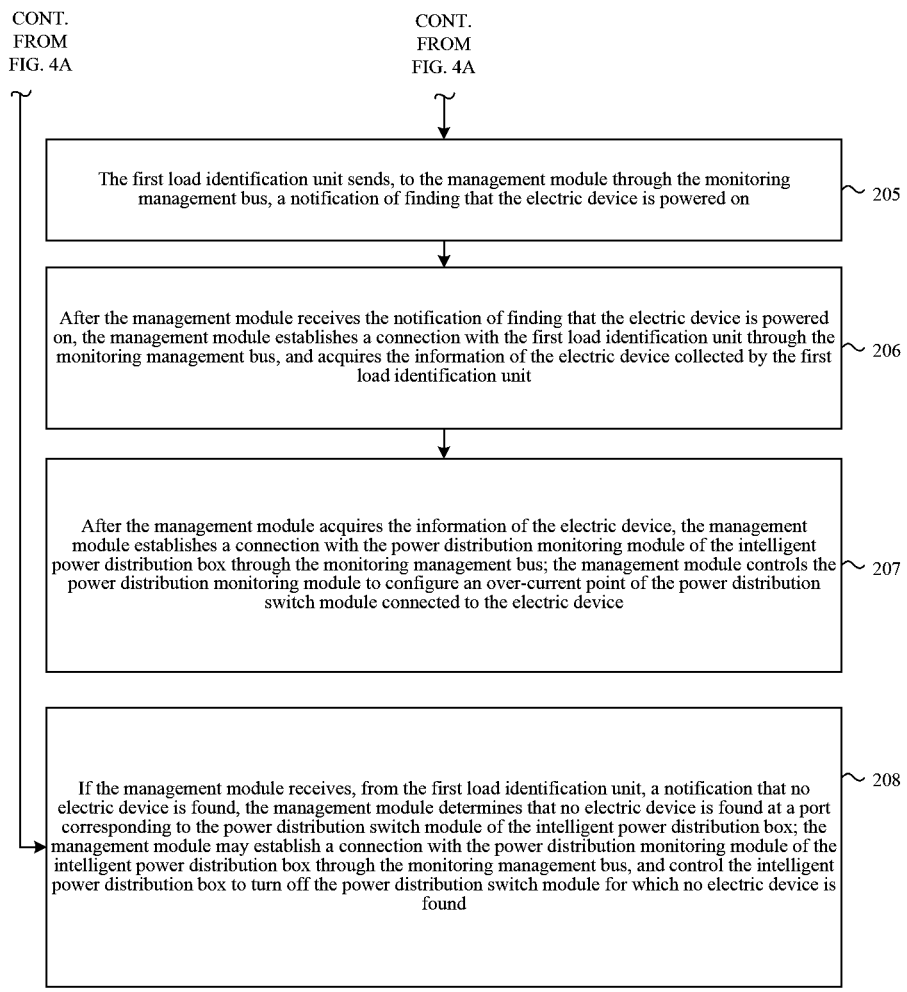

FIG. 4A and FIG. 4B are a flow chart of an intelligent power distribution method provided in Embodiment 4 of the present invention. As shown in FIG. 4A and FIG. 4B, on the basis of Embodiment 3, the intelligent power distribution method may specifically include:

Step 201: A management module establishes a connection with a power distribution monitoring module of an intelligent power distribution box through a monitoring management bus, instructs the power distribution monitoring module to control a certain power distribution switch module of the intelligent power distribution box to be turned on, so as to supply power for a rear end connected to a port of the power distribution switch module; where a supply current may initially be the maximum current of the power distribution switch module.

Step 202: The management module establishes a connection with a first load identification unit through a monitoring management bus, notifies the first load identification unit that a power distribution switch module of the intelligent power distribution box is turned on.

Step 203: The first load identification unit determines whether the rear end of the turned-on power distribution switch module finds that the electric device is powered on. If the rear end of the power distribution switch module finds that the electric device is powered on, a second load identification unit on the electric device starts to work and notifies, through a load identification bus, the first load identification unit of finding that the electric device is powered on, and step 204 is executed; if the rear of the power distribution switch module does not find that the electric device is powered on, the first load identification unit is unable to receive and find information sent by the second load identification unit on the finding electric device, and after waiting for a period of time, the first load identification unit notifies, through the monitoring management bus, the management module that no electric device is found; and step 208 is executed.

Step 204: After the first load identification unit receives the notification of finding that the electric device is powered on, the first load identification unit establishes a connection with the second load identification unit on the electric device through the load identification bus, and acquires information of the electric device, such as a device type and a power demand level.

Step 205: The first load identification unit sends, to the management module through the monitoring management bus, a notification of finding that the electric device is powered on, so as to notify the management module that a port corresponding to the power distribution switch module has an electric device and the electric device has been powered on.

Step 206: After the management module receives the notification of finding that the electric device is powered on, the management module establishes a connection with the first load identification unit through the monitoring management bus, and acquires the information of the electric device collected by the first load identification unit.

Step 207: After the management module acquires the information of the electric device, the management module establishes a connection with the power distribution monitoring module of the intelligent power distribution box through the monitoring management bus; the management module controls the power distribution monitoring module to configure an over-current point of the power distribution switch module connected to the electric device, and the procedure ends.

Step 208: If the management module receives, from the first load identification unit, a notification that no electric device is found, the management module determines that no electric device is found at a port corresponding to the power distribution switch module of the intelligent power distribution box; the management module may establish a connection with the power distribution monitoring module of the intelligent power distribution box through the monitoring management bus, and control the intelligent power distribution box to turn off the power distribution switch module for which no electric device is found, and the procedure ends.

Figure 5:
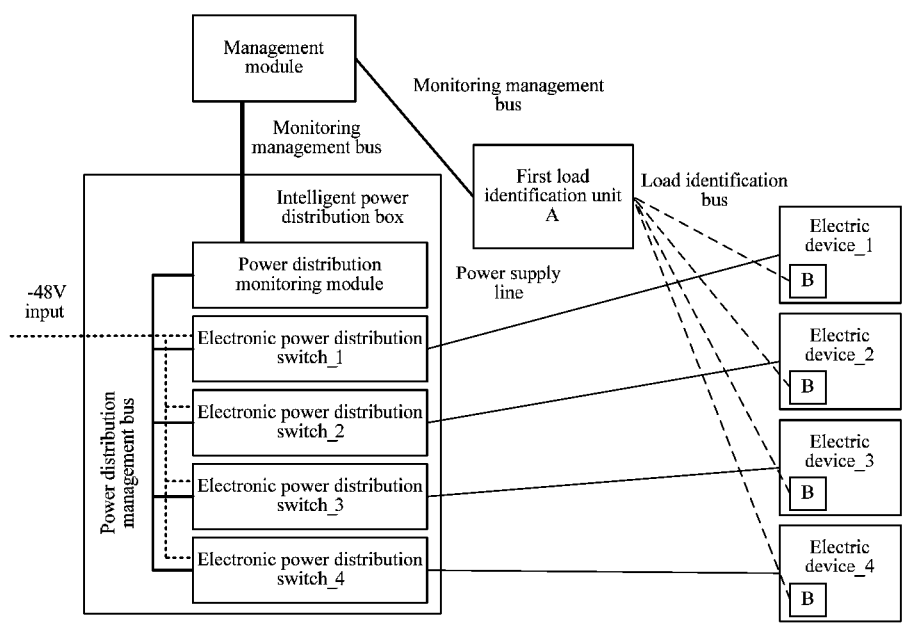
FIG. 5 is a schematic diagram of an application scenario of the intelligent power distribution method provided in Embodiment 4 of the present invention.

FIG. 5 is a schematic diagram of an application scenario of the intelligent power distribution method provided in Embodiment 4 of the present invention. As shown in FIG. 5, it is assumed that the power distribution switch module of the intelligent power distribution box is an electronic power distribution switch, for example: a port corresponding to an electronic power distribution switch_1 is connected to an electric device_1, and an operation flow of the electronic power distribution switch_1 of the intelligent power distribution box is described as follows:

The management module acquires, from a storage unit of the intelligent power distribution box, configuration information of the electronic power distribution switch_1, such as a device type and a power demand level (the intelligent power distribution box may be configured by default when being used for the first time), controls, through the power distribution monitoring module of the intelligent power distribution box, the electronic power distribution switch_1 of the intelligent power distribution box to be turned on; configures an initial over-current point; controls, through the power distribution monitoring module of the intelligent power distribution box, the electronic power distribution switch_1 of the intelligent power distribution box to be turned on, so as to supply power for the electric device_1 connected to the electronic power distribution switch_1; connects a −48 V power source to the electric device_1, so that a second load identification unit B of the electric device_1 starts to work and notifies a first load identification unit A in an intelligent power distribution system that the electric device_1 is powered on. At the same time, the management module notifies the first load identification unit A that the electronic power distribution switch_1 of the intelligent power distribution box is turned on. The first load identification unit A, after receiving information that the electric device_1 is powered on, may acquire, from the second load identification unit B of the electric device_1 through a load identification bus, information of the electric device_1, such as a device type and a power demand level. Thereafter, the first load identification unit A may notify the management module of the information of the electric device_1, and meanwhile, the management module may learn that a port corresponding to the electronic power distribution switch_1 of the intelligent power distribution box has an electric device_1, as well as the information of the electric device_1. Then, the management module compares collected actual configuration information of each power distribution switch module_1 with corresponding configuration information saved in the storage unit of the intelligent power distribution box, and when the actual configuration information is not consistent with the corresponding configuration information, updates the configuration information saved in the storage unit and, according to the information of the electric device_1, configures an over-current point of the electronic power distribution switch_1 by the power distribution monitoring module of the intelligent power distribution box; and if the actual configuration information is consistent with the corresponding configuration information, keeps the configuration information unchanged.

For another example, assume that a port corresponding to an electronic power distribution switch_2 of the intelligent power distribution box does not connect to an electric device, an operation flow of the electronic power distribution switch_2 of the intelligent power distribution box is described as follows:

The management module controls, through the power distribution monitoring module of the intelligent power distribution box, the electronic power distribution switch_2 of the intelligent power distribution box to be turned on, so as to supply power for the electric device_1 connected to the electronic power distribution switch_2, and connects a −48 V power source to a rear end. At the same time, the management module notifies the first load identification unit A that the electronic power distribution switch_2 of the intelligent power distribution box has been turned on. The first load identification unit A starts to wait for the second load identification unit B of the electric device reporting information of an electric device, and because no electric device is found, the first load identification unit A cannot receive information that an electric device is powered on during a period of time, so that the first load identification unit A may send, to the management module, a notification that no electric device is found. The management module, after receiving, from the first load identification unit A, the notification that no electric device is found, learns that no electric device is found at a port corresponding to the electronic power distribution switch_2 of the intelligent power distribution box. Then, the management module may establish a connection with the power distribution monitoring module of the intelligent power distribution box through the monitoring management bus, and control the electronic power distribution switch_2 of the intelligent power distribution box to be turned off, so as to stop supplying power for the rear end.

In this embodiment, the information of the electric device is acquired from the load identification module through the management module, so as to supply power for the electric device automatically, control an over-current point of the power distribution switch module automatically configured in the intelligent power distribution box, and control the circuit breaker capacity of the intelligent power distribution box; thereby reducing manual involvement during the power distribution, reducing a requirement on installation personnel of the intelligent power distribution box, and improving the installation efficiency and accuracy.

Persons skilled in the art may understand that all or part of steps of the methods in the embodiments may be implemented by a computer program instructing relevant hardware. The program may be stored in a computer readable storage medium. When the program is run, the steps of the methods in the embodiment are performed. The above storage medium includes various mediums capable of storing program code, such as a read-only memory (ROM), a random access memory (RAM), a magnetic disk or an optical disk, and the like.

Finally, it should be noted that the above embodiments of the present invention are merely intended for describing the technical solutions of the present invention other than limiting the present invention. Although the present invention is described in detail with reference to the foregoing embodiments, persons skilled in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. An intelligent power distribution system, comprising: a load identification module, a management module, and an intelligent power distribution box; wherein the management module is coupled to the load identification module and the intelligent power distribution box respectively; wherein
the load identification module is configured to identify an electric device coupled to the intelligent power distribution system, acquire information of the electric device, and send the acquired information of the electric device to the management module;
the management module is configured to send, according to the information of the electric device, a circuit configuration instruction corresponding to the electric device; and
the intelligent power distribution box is configured to configure, according to the circuit configuration instruction, a matched power supply circuit for the electric device, wherein the intelligent power distribution box is coupled to the electric device through a power supply line;
wherein the intelligent distribution box comprises at least one power distribution switch module and a storage unit, the storage unit is configured to store configuration information of each power distribution switch module; and
the management module is further configured to, acquire actual configuration information of each power distribution switch module; compare the actual configuration information with corresponding configuration information of the power distribution switch module stored in the storage unit, and if the actual configuration information is not consistent with the corresponding configuration information, configure an over-current point of the power distribution switch module according to the information of the electric device and update the corresponding configuration information of the power distribution switch module stored in the storage unit.

2. The intelligent power distribution system according to claim 1, wherein the management module is coupled to the load identification module and the intelligent power distribution box respectively through a monitoring management bus.

3. The intelligent power distribution system according to claim 2, wherein the load identification module comprises: a first load identification unit and a second load identification unit, the second load identification unit is coupled to the electric device, the first load identification unit is connected to the management module through the monitoring management bus, and the first load identification unit is connected to the second load identification unit through a load identification bus;
the first load identification unit is configured to: if receiving a notification of finding that the electric device is powered on sent by the second load identification unit, send the notification of finding that the electric device is powered on to the management module through the monitoring management bus; after establishing a connection with the second load identification unit through the load identification bus, acquire the information of the electric device from the second load identification unit through the load identification bus, and send the information of the electric device to the management module through the monitoring management bus; and if not receiving the notification of finding that the electric device is powered on sent by the second load identification unit, send a notification of not finding that the electric device is powered on to the management module; and
the second load identification unit is configured to save information of an electric device to which the second load identification unit belongs; if the electric device to which the second load identification unit belongs is powered on, send a notification of finding that the electric device is powered on to the first load identification unit; and after establishing the connection with the first load identification unit, send the information of the electric device to the first load identification unit through the load identification bus.

4. An intelligent power distribution method, used in an intelligent power distribution system comprising a management module and an intelligent power distribution box, wherein the management module is coupled to the intelligent power distribution box, and the intelligent power distribution box is coupled to an electric device through a power supply line, the method comprising:
acquiring, by the management module, information of the electric device;
sending, by the management module and according to the information of the electric device, a circuit configuration instruction corresponding to the electric device; and
configuring, by the intelligent power distribution box, a matched power supply circuit for the electric device according to the circuit configuration instruction,
storing, by a storage unit, store configuration information of each power distribution switch module, wherein the intelligent distribution box comprises at least one power distribution switch module and the storage unit;
acquiring, by the management module, actual configuration information of each power distribution switch module;
comparing, by the management module, the actual configuration information with corresponding configuration information of the power distribution switch module stored in the storage unit; and if the actual configuration information is not consistent with the corresponding configuration information, configuring, by the management module, an over-current point of the power distribution switch module, and updating, by the management module, the corresponding configuration information of the power distribution switch module stored in the storage unit.

5. The intelligent power distribution method according to claim 4, wherein the acquiring the information of the electric device comprises:
when the electric device is powered on, receiving, through a monitoring management bus, a notification that the electric device is powered on; and
according to the notification that the electric device is powered on, acquiring the information of the electric device through a load identification bus.

6. The intelligent power distribution method according to claim 4, further comprising:
receiving, by the management module, a notification indicates that the electric device is not powered on; and
instructing, by the management module, the intelligent power distribution box to turn off a power distribution switch module in the intelligent power distribution box.

7. The intelligent power distribution system according to claim 1, wherein the matched power supply circuit is a power distribution switch module in the intelligent distribution box.

8. The intelligent power distribution system according to claim 7, wherein the intelligent power distribution box comprises: a power distribution monitoring module and the power distribution switch module; the power distribution monitoring module is coupled to the management module, the power distribution switch module is coupled to the power distribution monitoring module and the electric device respectively; and
the power distribution monitoring module is configured to: according to the circuit configuration instruction, control ON or OFF of the power distribution switch module, and configure an over-current point of the power distribution switch module.

9. The intelligent power distribution system according to claim 8, wherein the power distribution monitoring module is coupled to the management module through the monitoring management bus, and the power distribution switch module is coupled to the power distribution monitoring module through a power distribution management bus.

10. The intelligent power distribution system according to claim 8, wherein the management module is further configured to receive a notification sent by the load identification module, and instruct the intelligent power distribution box to turn off the power distribution switch module when the received notification indicates that the electric device is not powered on.

11. The intelligent power distribution system according to claim 8, wherein the power distribution switch module is specifically an electronic power distribution switch.

12. The intelligent power distribution system according to claim 8, wherein the power distribution switch module comprises an electronic power distribution switch processor and a high-power metal oxide semiconductor, and the electronic power distribution switch processor comprises a micro processor, a programmable logic device, or a digital signal processor.

* * * * *